(12) United States Patent
Oishi (10) Patent No.: US 9,055,292 B2
(45) Date of Patent: Jun. 9, 2015

(54) MOVING IMAGE ENCODING APPARATUS, METHOD OF CONTROLLING THE SAME, AND COMPUTER READABLE STORAGE MEDIUM

(75) Inventor: Akihiro Oishi, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 465 days.

(21) Appl. No.: 13/080,107

(22) Filed: Apr. 5, 2011

(65) Prior Publication Data

US 2011/0249740 A1   Oct. 13, 2011

(30) Foreign Application Priority Data

Apr. 12, 2010 (JP) ................................. 2010-091829
Apr. 1, 2011 (JP) ................................. 2011-082191

(51) Int. Cl.
*H04N 7/32* (2006.01)
*H04N 19/14* (2014.01)
(Continued)

(52) U.S. Cl.
CPC ......... *H04N 19/14* (2014.11); *H04N 19/00157* (2013.01); *H04N 19/176* (2014.11); *H04N 19/122* (2014.11); *H04N 19/61* (2014.11); *H04N 19/11* (2014.11)

(58) Field of Classification Search
CPC .............................................. H04N 19/00157
USPC ............................... 375/240–240.02, 240.08, 375/240.12–240.13, 240.21, 240.24
See application file for complete search history.

(56) References Cited

U.S. PATENT DOCUMENTS 6,801,339 B1 * 10/2004 Ito ................................. 358/3.26
8,199,818 B2   6/2012 Yoshino et al.
(Continued)

FOREIGN PATENT DOCUMENTS

JP   10-051643 A   2/1998
JP   2007-067469 A   3/2007
(Continued)

OTHER PUBLICATIONS

English translation of Syungo Kikuchi, et al., Extraction of Gradation Regions from Natural Images using Watershed Segmentation (Mar. 7, 2005, p. 40) (The article was previously submitted on Sep. 16, 2014).
(Continued)

*Primary Examiner* — Christopher S Kelley
*Assistant Examiner* — Jonathan Messmore
(74) *Attorney, Agent, or Firm* — Cowan, Liebowitz & Latman, P.C.

(57) ABSTRACT

A moving image encoding apparatus for dividing an image into image blocks and performing intra-prediction encoding of a target image block using pixel values of an image block adjacent to the target image block, comprises a prediction unit for performing intra-prediction in accordance with one of intra-prediction modes corresponding to divided block sizes and outputting intra-predicted image data for the target image block, a determination unit for, when the target image block is a low frequency band image, determining by detecting a change in the pixel value in the image block whether the target image block includes a gradation image, and a decision unit for, when it is determined that the target image block includes the gradation image, deciding a block size of the intra-prediction so as to cause the prediction unit to preferentially select a minimum block size of the divided block sizes.

24 Claims, 6 Drawing Sheets

(51) Int. Cl.
*H04N 19/176* (2014.01)
*H04N 19/122* (2014.01)
*H04N 19/61* (2014.01)
*H04N 19/11* (2014.01)

(56) References Cited

U.S. PATENT DOCUMENTS

| | | | |
|---|---|---|---|
| 8,228,998 B2 | 7/2012 | Shimizu et al. | |
| 2006/0165163 A1* | 7/2006 | Burazerovic et al. | 375/240.03 |
| 2008/0240238 A1 | 10/2008 | Yoshino et al. | |
| 2009/0040157 A1* | 2/2009 | Nishitani et al. | 345/87 |
| 2009/0046781 A1* | 2/2009 | Moriya et al. | 375/240.12 |
| 2010/0020872 A1* | 1/2010 | Shimizu et al. | 375/240.12 |
| 2011/0280308 A1 | 11/2011 | Oishi et al. | |

FOREIGN PATENT DOCUMENTS

| | | |
|---|---|---|
| JP | 2007-0201558 A | 8/2007 |
| JP | 2008-167309 A | 7/2008 |
| JP | 2008-245088 | 10/2008 |
| WO | 2008/044658 A | 4/2008 |

OTHER PUBLICATIONS

The documents cited herein were cited in the Sep. 5, 2014 Japanese Office Action, which is enclosed without an English Translation, that issued in Japanese Patent Application No. 2011-082191.

Syungo Kikuchi, et al., Extraction of Gradation Regions from Natural Images using Watershed Segmentation, Proceedings of the 2005 IEICE General Conference, ISSN 1349-1369, Mar. 21-24, 2005.

* cited by examiner

MOVING IMAGE ENCODING APPARATUS, METHOD OF CONTROLLING THE SAME, AND COMPUTER READABLE STORAGE MEDIUM

BACKGROUND OF THE INVENTION

1. Field of the Invention

The present invention relates to a moving image encoding apparatus, a method of controlling the same, and a computer readable storage medium.

2. Description of the Related Art

Encoding methods called MPEG-1 and MPEG-2 have recently been established as a technique of efficiently encoding moving image data. A digitized moving image has an enormous data amount. For this reason, research is continuously being conducted to develop a moving image encoding method expected to implement compression at a ratio higher than in the above-described MPEG-1 and MPEG-2. The ITU-T (International Telecommunication Union-Telecommunication Standardization Sector) and the ISO (International Organization for Standardization) have recently standardized an encoding method called H.264/MPEG-4 part10 (to be referred to as H.264 hereinafter). H.264 needs a larger calculation amount in encoding or decoding as compared to the conventional encoding methods such as MPEG-1 and MPEG-2 but is known to implement a higher encoding efficiency.

H.264 uses a prediction method called intra-prediction to predict pixel values in the same frame using intra-frame pixel values. This intra-prediction has a plurality of intra-prediction modes and selectively uses them, as defined. Selecting an intra-prediction mode suitable for an input image allows for the generation of encoded data that suffers little deterioration at a high compression ratio.

When an input image has a pattern such that the values of continuous pixels gradually change in a frame, intra-prediction is difficult, as is known. To cope with this, there has been proposed a method of estimating the direction of the intra-prediction mode in accordance with the direction of pixel value change (Japanese Patent Laid-Open No. 2008-245088).

SUMMARY OF THE INVENTION

An image encoding apparatus complying with the H.264 standard normally uses a method of selecting an optimum mode of a plurality of intra-prediction modes by trying to encode the divided block sizes of all the prepared intra-prediction modes. This leads to an increase in the calculation amount of the image encoding apparatus and thus results in an excess encoding processing time and a waste of power. That is, efficiently selecting a block size suitable for an encoding target image in intra-prediction is important from the viewpoint of calculation amount reduction of the image encoding apparatus.

However, the method of the prior art increases the number of pixels to be used for intra-prediction and executes pixel prediction processing more complex than the standard, resulting in a further increase in the calculation amount. In addition, the method of the prior art does not associate the pixel value change tendency with the divided block size upon intra-prediction.

The present invention allows easy selection of an appropriate divided block size for intra-prediction encoding in consideration of the pixel value change tendency.

Even when encoding an image for which intra-prediction is difficult because of gradually changing pixel values, an increase in calculation amount is suppressed.

One aspect of embodiments of the present invention relates to a moving image encoding apparatus for dividing an image into a plurality of image blocks and performing intra-prediction encoding of an encoding target image block using pixel values of an image block adjacent to the encoding target image block. The apparatus comprises a prediction unit configured to perform intra-prediction in accordance with one of a plurality of intra-prediction modes corresponding to a plurality of divided block sizes and outputting intra-predicted image data for the encoding target image block, a determination unit configured to, when the encoding target image block is a low frequency band image, determine by detecting a change in the pixel value in the image block whether the encoding target image block includes a gradation image, and a block size decision unit configured to, when the determination unit determines that the encoding target image block includes the gradation image, decide a block size of the intra-prediction so as to cause the prediction unit to preferentially select a minimum block size of the plurality of divided block sizes.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention, and together with the description, serve to explain the principles of the invention.

DESCRIPTION OF THE EMBODIMENTS

An embodiment of the present invention will now be described with reference to the accompanying drawings.

Figure 1:
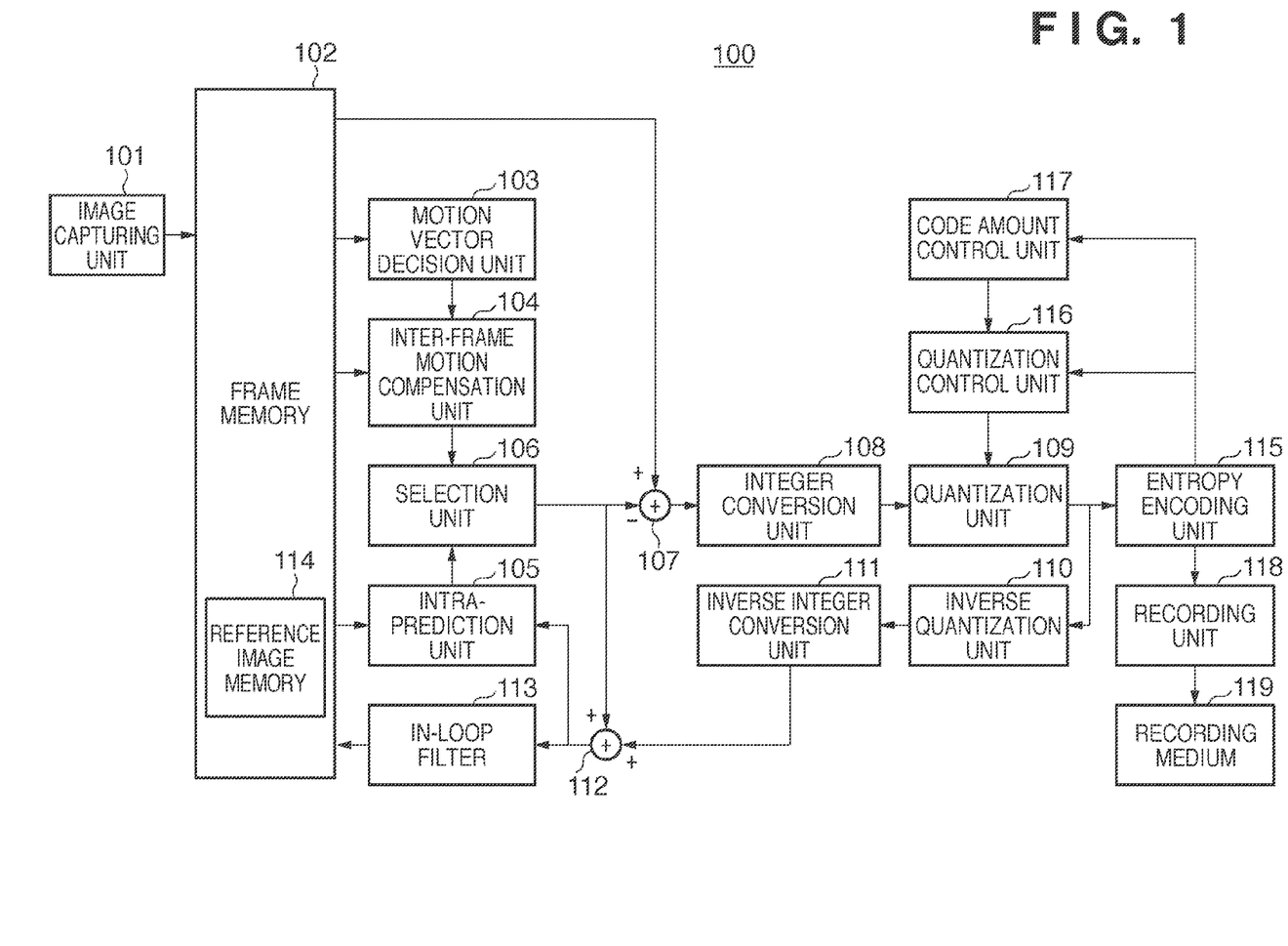
FIG. 1 is a block diagram showing an example of the arrangement of a moving image encoding apparatus according to an embodiment of the present invention.

FIG. 1 is a block diagram showing an example of the arrangement of a moving image encoding apparatus 100 according to the embodiment. The apparatus includes: an image capturing unit 101 including a camera unit with a lens, an image sensor, and the like; a frame memory 102; a motion vector decision unit 103 that searches for motion vectors; and an inter-frame motion compensation unit 104 that generates inter-predicted image data based on the motion vectors. The apparatus also includes an intra-prediction unit 105 that generates intra-predicted image data, a selection unit 106 that selects one of the inter-predicted image data and the intra-predicted image data, a subtracter 107, an integer conversion unit 108, and a quantization unit 109. The apparatus also includes an inverse quantization unit 110, an inverse integer conversion unit 111, an adder 112, an in-loop filter 113, an entropy encoding unit 115, a quantization control unit 116, a code amount control unit 117, and a recording unit 118. A recording medium 119 is attached to the moving image encoding apparatus 100. The frame memory 102 includes a reference image memory 114 that stores a reference image to be used for inter-prediction.

The blocks of the moving image encoding apparatus 100 shown in FIG. 1 may be constituted by hardware using dedicated logic circuits and memories. Alternatively, the blocks may be constituted using software by causing a CPU to execute processing programs stored in a memory.

Moving image data obtained by image capturing of the image capturing unit 101 is stored in the frame memory 102 as the first frame, second frame, third frame, . . . sequentially in the generation order. The image data is extracted from the frame memory 102 in the encoding order of, for example, third frame, first frame, second frame, . . . .

Encoding methods include intra-prediction encoding that encodes only image data within frames and inter-prediction encoding that encodes also predicted image data between frames. Pictures used in inter-prediction encoding are a P picture that makes a prediction between the unit of motion compensation (MC block) and one reference frame and a B picture that makes predictions between the MC block and two reference frames. On the other hand, intra-prediction encoding uses an I picture. Note that the frames are encoded in the order different from the frame input order so as to enable not only prediction for a past frame but also prediction (backward prediction) with respect to a future frame in terms of time.

When performing intra-prediction encoding, the image data of an encoding target block serving as an encoding unit is read out from the frame memory 102 and input to the intra-prediction unit 105. In this embodiment, one encoding target block is formed from 16×16 pixels. The data of pixels adjacent to the readout encoding target block are also read out from the frame memory 102 and input to the intra-prediction unit 105.

The intra-prediction unit 105 performs block matching between the encoding target block and a plurality of intra-predicted image data generated from the data of the pixels adjacent to the encoding target block. At this time, the macroblock having 16×16 pixels is divided based on a divided block size decided in correspondence with the embodiment. Intra-predicted image data having the highest correlation is selected and output to the selection unit 106. When performing intra-prediction encoding, the selection unit 106 always selects the output from the intra-prediction unit 105 and outputs the intra-predicted image data to the subtracter 107.

The subtracter 107 receives the intra-predicted image data and the data of the image block of the encoding target image read out from the frame memory 102, and outputs, to the integer conversion unit 108, the difference image data of pixel values between the image block of the encoding target image and the intra-predicted image data. The integer conversion unit 108 performs integer conversion for the input difference image data of pixel values. The quantization unit 109 quantizes the signal that has undergone the integer conversion of the integer conversion unit 108.

The entropy encoding unit 115 entropy-encodes conversion coefficients quantized by the quantization unit 109, and outputs them to the recording unit 118 as a data stream. Quantization coefficients in the quantization unit 109 are calculated by the quantization control unit 116 based on a code amount generated by the entropy encoding unit 115 and a target code amount set by the code amount control unit 117.

The recording unit 118 records, in the recording medium 119, the data stream output from the entropy encoding unit 115.

The conversion coefficients quantized by the quantization unit 109 are also input to the inverse quantization unit 110. The inverse quantization unit 110 inversely quantizes the input conversion coefficients. The inverse integer conversion unit 111 performs inverse integer conversion processing for the inversely quantized signal.

The adder 112 receives and adds the data that has undergone the inverse integer conversion processing and the intra-predicted image data generated by the intra-prediction unit 105. The added data is decoded reconstructed image data which is input to the intra-prediction unit 105 and used to generate intra-predicted image data. The reconstructed image data is also subjected to encoding distortion reduction processing by the in-loop filter 113 and is stored in the reference image memory 114 as reference image data to be used in inter-prediction encoding to be described later.

On the other hand, when performing inter-prediction encoding, the image block of an encoding target image serving as an encoding unit is read out from the frame memory 102 and input to the motion vector decision unit 103. The motion vector decision unit 103 reads out reference image data from the reference image memory 114, decides motion vectors based on the reference image and the image block of the encoding target image, and notifies the inter-frame motion compensation unit 104 of them.

The inter-frame motion compensation unit 104 generates inter-predicted image data using the motion vectors decided by the motion vector decision unit 103 and the reference image obtained from the frame memory 102, and supplies the inter-predicted image data to the selection unit 106 together with the motion vectors. When performing inter-prediction encoding, the selection unit 106 selects the inter-predicted image data and supplies it to the subtracter 107.

Note that in some frames, inter-prediction or intra-prediction can be selected for each encoding target block. When performing intra-prediction, the above-described operation is performed, and the intra-prediction result is sent to the selection unit 106. When performing inter-prediction, the selection unit 106 selects the inter-predicted image data from the inter-frame motion compensation unit 104 and outputs it to the subtracter 107. Based on the inter-prediction result from the motion vector decision unit 103 and the intra-prediction result from the intra-prediction unit 105, the selection unit 106 can select, for example, a prediction method with a smaller difference value.

The subtracter 107 calculates the difference between the predicted image and the image block of the encoding target image to generate difference image data. The difference image data is output to the integer conversion unit 108. Subsequent processing is the same as that in the above-described intra-prediction encoding.

In H.264, an optimum size of a plurality of block sizes prepared in advance needs to be selected for each macroblock based on the code amount and image quality. In this embodiment, an invention to decide the divided block size of intra-prediction will particularly be described. There are three divided block sizes 4×4, 8×8, and 16×16 (the numerical values represent the number of pixels) for intra-prediction. The intra-prediction unit 105 selects an optimum divided block size based on the pattern (feature) of an encoding target image.

Generally, in a low frequency band image, block noise generated at the macroblock boundaries is more visually noticeable than usual. For this reason, if a large divided block size is selected for the low frequency band image from the viewpoint of encoding efficiency, block noise is generated. It is conspicuous when the encoding target image is, for example, sky or skin with gradations. This is the image for which intra-prediction is difficult (the image that cannot be encoded efficiently).

Figure 2A:
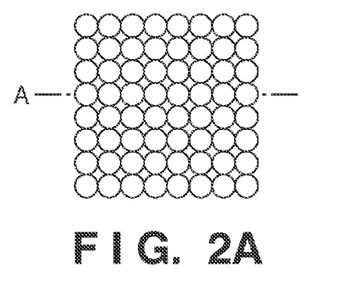
FIGS. 2A to 2D are conceptual views for explaining divided block sizes.
Figure 2B:
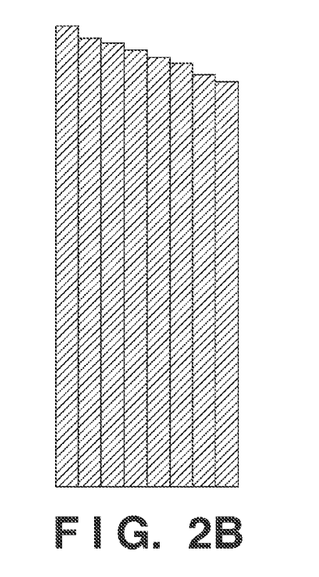
Figure 2C:
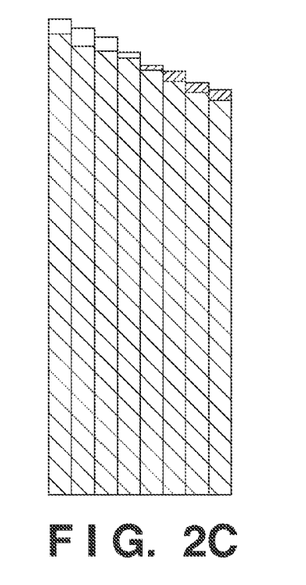
Figure 2D:
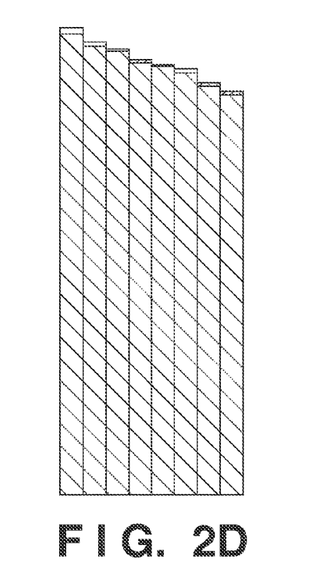

The structure of such a low frequency band image will be described below with reference to FIGS. 2A to 2D. FIG. 2A shows encoding target image data including 8×8 pixels. A represents the section of eight horizontal pixels. FIG. 2B illustrates the luminance values on the section A as heights. As is apparent from FIG. 2B, the luminance values in this image gradually decrease from the left to the right of the drawing. This tendency to gradually change the continuous pixel values forms a so-called gradation. FIG. 2C illustrates the luminance values of the eight pixels on the section A, which are encoded in the divided block size 8×8, as heights. FIG. 2D illustrates the luminance values of the eight pixels on the section A, which are encoded in the divided block size 4×4, as heights.

FIGS. 2B to 2D are compared. The error (quantization error) is smaller in 4×4 block encoding than in 8×8 block encoding because the block size is smaller. More specifically, the error becomes smaller in the order of 4×4, 8×8, and 16×16 in the gradation image. However, when the division number is large, the information amount of the header and the like also increases. If the luminance value does not change, 16×16 block encoding is most efficient. In this embodiment, an intra-prediction unit will be explained, which is configured to preferentially use the 16×16 block but adaptively select the 8×8 or 4×4 block in accordance with the pixel value change tendency.

Figure 3:
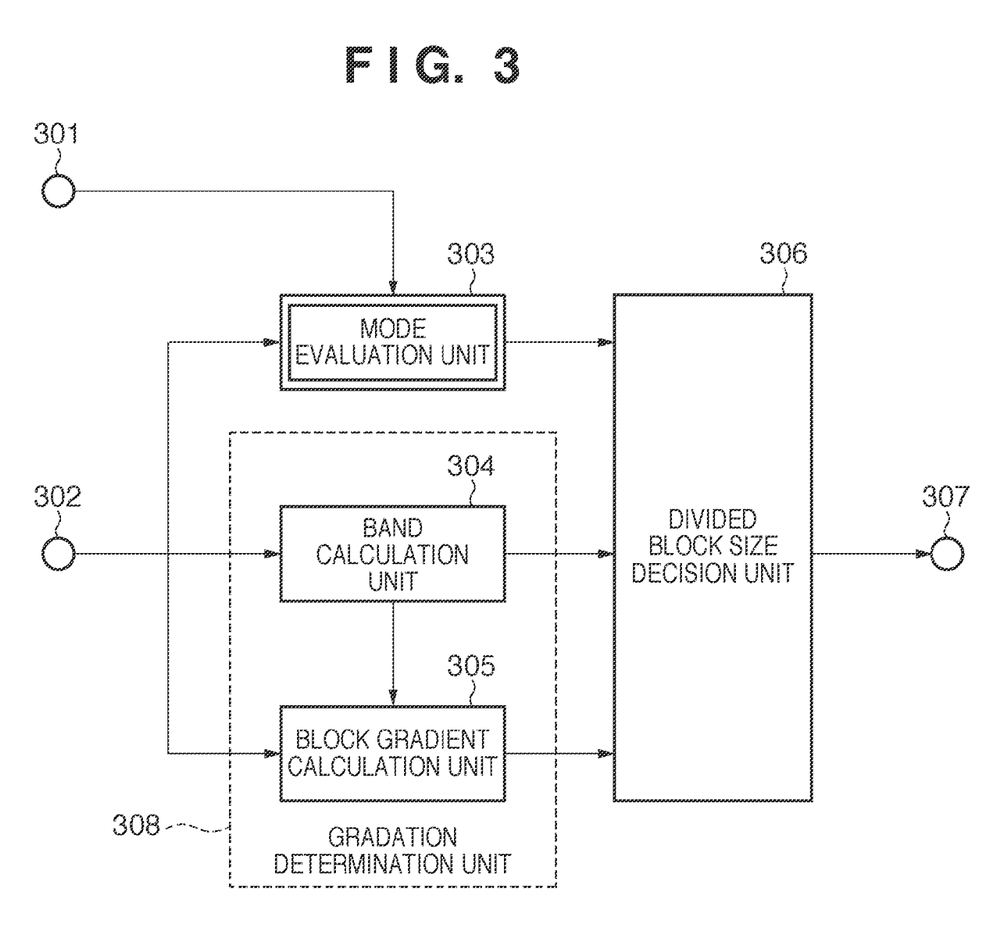
FIG. 3 is a block diagram showing an example of the arrangement of an intra-prediction unit according to the embodiment of the present invention.

This embodiment provides a method of causing the intra-prediction unit 105 to optimize divided block size selection. Divided block size decision processing in the intra-prediction unit 105 will be described below in detail. FIG. 3 is a block diagram showing the detailed arrangement of the intra-prediction unit 105 according to this embodiment. An input terminal 301 is connected to the adder 112 to input, to a mode evaluation unit 303, an image (local decoded image) that has been encoded and then locally decoded.

An input terminal 302 is connected to the frame memory 102 to input an encoding target block image. The image block input from the input terminal 302 is supplied to the mode evaluation unit 303, a band calculation unit 304, and a block gradient calculation unit 305. The band calculation unit 304 and the block gradient calculation unit 305 constitute a gradation determination unit 308.

In accordance with the prediction direction of each intra-prediction mode, the mode evaluation unit 303 calculates an evaluation value α that is the sum of absolute differences between predicted pixel values and actual pixel values. The evaluation value α is calculated for each of the plurality of intra-prediction modes and represents the evaluation value of each intra-prediction mode. The calculated evaluation values α are input to a divided block size decision unit 306.

To determine the frequency band of the macroblock image, the band calculation unit 304 calculates the variance (Var) of pixel values included in the image block and determines the band based on the magnitude. More specifically, an image having a larger variance can be determined as an image on the higher frequency band side. An image having a smaller variance can be determined as an image on the lower frequency band side. The frequency band determination may be done based on the coefficients of AC frequency components obtained by orthogonal transformation such as DCT. After the frequency band determination, an image that is not a low frequency band image undergoes normal processing of deciding the optimum divided block size based on the code amount and the above-described evaluation value α. On the other hand, for an image belonging to a low frequency band to which the present invention should be applied, processing to be described below is executed to decide the optimum divided block size based on the above-described evaluation value α and a gradation determination result.

Figure 4:
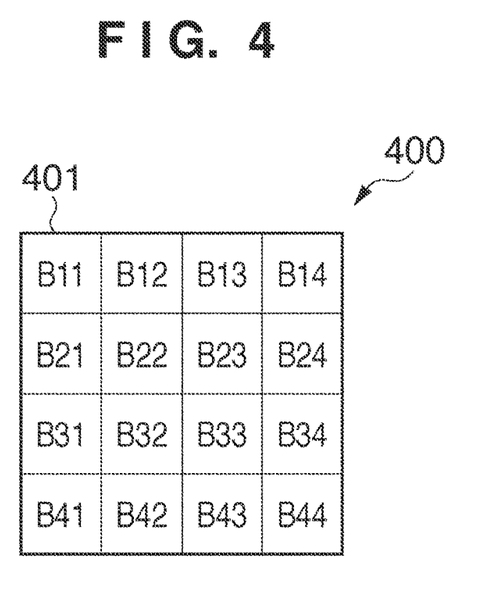
FIG. 4 is a view showing an example in which the interior of an encoding target macroblock is further divided into sub-blocks.

FIG. 4 shows an example in which a macroblock including 16×16 pixels is further divided into sub-blocks. In this embodiment, an example will be described in which the interior of a macroblock 400 is divided into sub-blocks 401 each having 4×4 pixels. That is, the macroblock 400 including 16×16 pixels is formed from 16 sub-blocks 401. In each sub-block 401, the luminance average of the 16 pixels included in the sub-block is obtained as Bij (B11 to B44).

Divided block size decision processing corresponding to this embodiment will be described next with reference to the flowchart of FIG. 5. The band calculation unit 304 first calculates the variance Var of a 16×16 image block of an input encoding target image in step S501, and then compares the variance Var with a first variance threshold Th1 in step S502. If the variance Var is equal to or smaller than the first variance threshold Th1 (NO in step S502), the process advances to step S503. If the variance Var is larger than the first variance threshold Th1 (YES in step S502), the gradation determination unit 308 determines that the image is not a low frequency band image. Normal intra-prediction of deciding the optimum divided block size based on the code amount and the evaluation value α is executed, and the procedure ends. More specifically, in normal intra-prediction, the block size is decided to preferentially use 16×16.

The first variance threshold Th1 is used to separate a low frequency band image from other images. The first variance threshold Th1 can be set as a value capable of appropriately separating a low frequency band image from other images based on variances obtained for a plurality of sample images.

In step S503, the variance Var is compared with a second variance threshold Th2. The second variance threshold Th2 is set close to 0 so as to allow detection of an image block rarely containing AC components even in a flat portion. If the variance Var is smaller than the second variance threshold Th2 (YES in step S503), the gradation determination unit 308 determines that the encoding target image is a low frequency band image but not a gradation image, and the process advances to step S511. In step S511, the band calculation unit 304 notifies the divided block size decision unit 306 of the determination result based on the second variance threshold Th2. The divided block size decision unit 306 decides the maximum size 16×16 as the divided block size of the encoding target block in accordance with the determination result. In step S511, instead of fixing the size to 16×16, weighting processing concerning the block size decision may be performed to preferentially select 16×16. On the other hand, if the variance Var is equal to or larger than the second variance threshold Th2 (NO in step S503), the process advances to step S504.

In step S504, the block gradient calculation unit 305 calculates the luminance averages B11 to B44 of the sub-blocks 401, and decides a maximum value Bmax and a minimum value Bmin among them. In step S505, the change from Bmax to Bmin is calculated. More specifically, Bdiff is calculated by subtracting Bmin from Bmax. Bdiff is the luminance range of the sub-block. When Bdiff is large, block noise is noticeable. Hence, Bdiff is compared with a luminance threshold Th3 in step S506.

If Bdiff is larger than the luminance threshold Th3 (YES in step S506), the gradation determination unit 308 determines that the encoding target image includes a gradation image, and the process advances to step S509. In step S509, the block gradient calculation unit 305 notifies the divided block size decision unit 306 of the determination result based on the luminance threshold Th3. The divided block size decision unit 306 decides the minimum size 4×4 as the divided block size of the encoding target block in accordance with the determination result. In step S509, instead of fixing the size to 4×4, weighting processing concerning the block size decision may be performed to preferentially select 4×4.

On the other hand, if Bdiff is equal to or smaller than the luminance threshold (NO in step S506), the block gradient calculation unit 305 calculates Bdelta in step S507. Bdelta is obtained by calculating the absolute differences between adjacent sub-blocks 401.

For example, the blocks B12, B21, and B22 are adjacent to the block B11. Hence, |B11−B12|, |B11−B21|, and |B11−B22| are calculated.

The absolute differences between all adjacent blocks are thus obtained. The maximum value of the obtained values Bdelta is defined as Max Bdelta. In step S508, Max Bdelta is compared with a difference threshold Th4. If Max Bdelta is larger than the difference threshold Th4 (YES in step S508), the gradation determination unit 308 determines that the encoding target image includes a gradation image, and the process advances to step S509. In step S509, the block gradient calculation unit 305 notifies the divided block size decision unit 306 of the determination result based on the difference threshold Th4. The divided block size decision unit 306 decides 4×4 as the divided block size of the encoding target block in accordance with the determination result. In step S509, instead of fixing the size to 4×4, weighting processing concerning the block size decision may be performed to preferentially select 4×4.

If Max Bdelta is equal to or smaller than the difference threshold Th4 (NO in step S508), the process advances to step S510. In step S510, the block gradient calculation unit 305 notifies the divided block size decision unit 306 of the determination result based on the difference threshold Th4. The divided block size decision unit 306 decides 8×8 as the divided block size of the encoding target block in accordance with the determination result. In step S510, instead of fixing the size to 8×8, weighting processing concerning the block size decision may be performed to preferentially select 8×8.

Based on the divided block size decided in accordance with the above-described procedure, the intra-prediction unit 105 selects the optimum evaluation value of the corresponding block size from the evaluation values obtained by the mode evaluation unit 303 for the plurality of intra-prediction modes. Intra-predicted image data that is the result of intra-prediction is output from an output terminal 307 and supplied to the selection unit 106.

Figure 5:
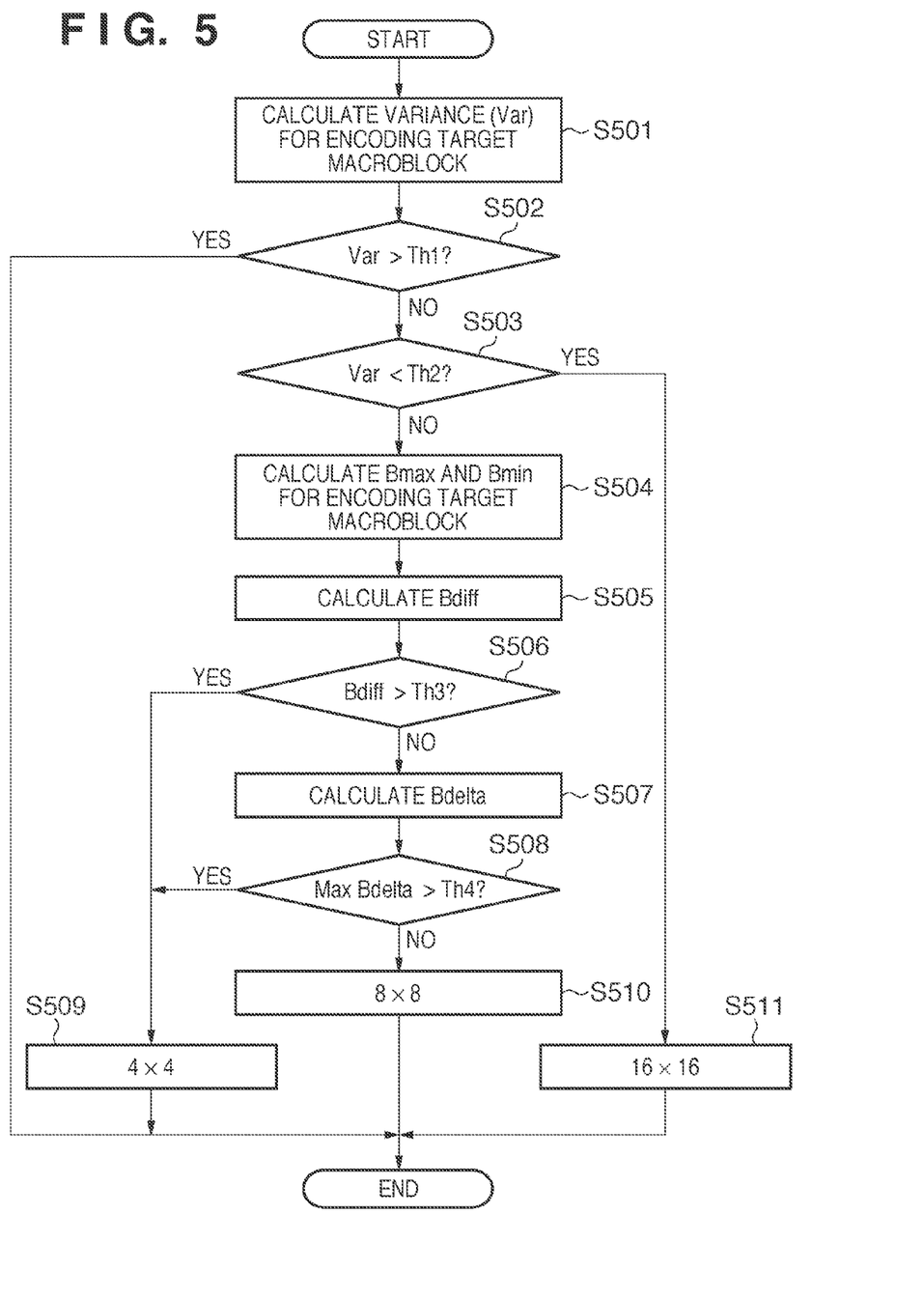
FIG. 5 is a flowchart of divided block size decision processing.

Note that in FIG. 5, a low frequency band image and other images are separated based on the variance. Instead, the separation may be done based on the coefficients of AC frequency components obtained by orthogonal transformation. In this case, images can be separated depending on whether a significant coefficient exists for components belonging to the high frequency band out of the AC frequency components.

Figure 6:
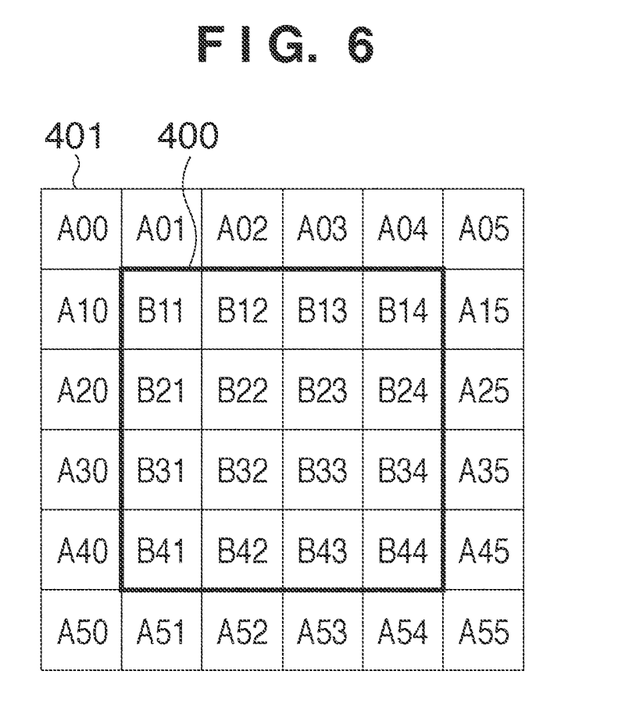
FIG. 6 is a view showing an example in which the periphery of an encoding target macroblock is further divided into sub-blocks.

Note that processing closed in a macroblock that is an encoding target image block has been described above. However, the divided block size can also be decided in consideration of adjacent sub-blocks located outside the macroblock, as shown in FIG. 6. In this case, ABdelta is calculated in step S507 of FIG. 5 in place of Bdelta. ABdelta is obtained by calculating the absolute differences between adjacent sub-blocks outside the macroblock in addition to Bdelta described above. For example, sub-blocks A00, A01, A02, A10, and A20 outside the macroblock are adjacent to the block B11. Hence, |B11−A00|, |B11−A01|, |B11−A02|, |B11−A10|, and |B11−A20| are calculated. However, sub-blocks A50 to A55 in the horizontal direction and sub-blocks A05 to A45 in the vertical direction in FIG. 6 need not always be referred to.

The absolute differences between all adjacent blocks inside and outside the macroblock are thus obtained. A maximum value Max ABdelta is decided among them. In step S508, Max ABdelta is compared with the difference threshold Th4. If Max ABdelta is larger than the difference threshold Th4, 4×4 is decided as the divided block size in step S509. If Max ABdelta is equal to or smaller than the difference threshold, 8×8 is decided as the divided block size in step S510.

As described above, according to this embodiment, it is possible to select the divided block size to be applied based on the variance of the macroblock, the luminance range within the macroblock or including the periphery of the macroblock, and the absolute differences between the sub-blocks. This allows for easy selection of a preferable divided block size in intra-prediction for an image portion belonging to the low frequency band and thus reduction of the calculation processing in encoding. In addition, since the divided block size is adaptively decided by comparing a plurality of parameters with thresholds, stripes generated by block noise upon encoding an image including a gradation can be reduced.

Note that the thresholds used in the above-described embodiments need not always be fixed. A plurality of combinations may be prepared in accordance with the magnitude of the variance Var. In the above-described embodiment, the minimum block size is 4×4. However, the minimum block size may be larger or smaller than 4×4. Processing may be performed for each pixel.

OTHER EMBODIMENTS

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-091829 filed Apr. 12, 2010, and No. 2011-082191 filed Apr. 1, 2011, which are hereby incorporated by reference herein in their entirety.

What is claimed is:
1. An encoding apparatus comprising:
   a determination unit that (a) determines whether or not an image corresponding to a target block including pixels is a low frequency band image, and (b) determines whether or not the image corresponding to the target block includes a gradation image if the image corresponding to the target block is the low frequency band image; and an encoding unit that performs an encoding process of using an intra-prediction coding to encode the target block, wherein the target block is encoded by using at least one of a first block size, a second block size, and a third block size if the image corresponding to the target block is not the low frequency band image, wherein the target block is encoded by using the third block size prior to the first block size and the second block size if the image corresponding to the target block is the low frequency band image and includes the gradation image, wherein the target block is encoded by using the first block size prior to the second block size and the third block size if the image corresponding to the target block is the low frequency band image and does not include the gradation image, wherein the third block size is smaller than the second block size, and the second block size is smaller than the first block size, and wherein at least one of the determination unit and the encoding unit has a hardware structure.

2. The encoding apparatus according to claim 1, wherein the intra-prediction coding used to encode the target block is based on H.264.

3. The encoding apparatus according to claim 1, wherein the determination unit is configured to use a variance calculated from pixels included in the target block to determine whether or not the image corresponding to the target block is the low frequency band image.

4. The encoding apparatus according to claim 1, wherein the determination unit is configured to use a difference between a maximum value of luminance averages and a minimum value of the luminance averages to determine whether or not the image corresponding to the target block is the gradation image, and wherein the luminance averages are calculated from blocks included in the target block.

5. The encoding apparatus according to claim 1, wherein the first block size corresponds to 16×16 pixels, the second block size corresponds to 8×8 pixels, and the third block size corresponds to 4×4 pixels.

6. A method comprising:

determining whether or not an image corresponding to a target block including pixels is a low frequency band image;

determining whether or not the image corresponding to the target block includes a gradation image if the image corresponding to the target block is the low frequency band image; and performing an encoding process of using an intra-prediction coding to encode the target block, wherein the target block is encoded by using at least one of a first block size, a second block size, and a third block size if the image corresponding to the target block is not the low frequency band image, wherein the target block is encoded by using the third block size prior to the first block size and the second block size if the image corresponding to the target block is the low frequency band image and includes the gradation image, wherein the target block is encoded by using the first block size prior to the second block size and the third block size if the image corresponding to the target block is the low frequency band image and does not include the gradation image, and wherein the third block size is smaller than the second block size, and the second block size is smaller than the first block size.

7. A non-transitory computer readable storage medium storing a program which causes a computer to execute a method, the method comprising:

determining whether or not an image corresponding to a target block including pixels is a low frequency band image;

determining whether or not the image corresponding to the target block includes a gradation image if the image corresponding to the target block is the low frequency band image; and performing an encoding process of using an intra-prediction coding to encode the target block, wherein the target block is encoded by using at least one of a first block size, a second block size, and a third block size if the image corresponding to the target block is not the low frequency band image, wherein the target block is encoded by using the third block size prior to the first block size and the second block size if the image corresponding to the target block is the low frequency band image and includes the gradation image, wherein the target block is encoded by using the first block size prior to the second block size and the third block size if the image corresponding to the target block is the low frequency band image and does not include the gradation image, and wherein the third block size is smaller than the second block size, and the second block size is smaller than the first block size.

8. The encoding apparatus according to claim 1, wherein a block size of the target block corresponds to 16×16 pixels.

9. The encoding apparatus according to claim 1, wherein the determination unit is configured to use pixels adjacent to the target block to determine whether or not the image corresponding to the target block is the gradation image.

10. The encoding apparatus according to claim 1, further comprising an image capture unit that captures an image, and generates image data corresponding to the captured image, wherein the target block corresponds to a part of the captured image.

11. The method according to claim 6, wherein the intra-prediction coding used to encode the target block is based on H.264.

12. The method according to claim 6, further comprising:

using a variance calculated from pixels included in the target block to determine whether or not the image corresponding to the target block is the low frequency band image.

13. The method according to claim 6, further comprising:

using a difference between a maximum value of luminance averages and a minimum value of the luminance averages to determine whether or not the image corresponding to the target block is the gradation image, wherein the luminance averages are calculated from blocks included in the target block.

14. The method according to claim 6, wherein the first block size corresponds to 16×16 pixels, the second block size corresponds to 8×8 pixels, and the third block size corresponds to 4×4 pixels.

15. The method according to claim 6, wherein a block size of the target block corresponds to 16×16 pixels.

16. The method according to claim 6, further comprising:

using pixels adjacent to the target block to determine whether or not the image corresponding to the target block is the gradation image.

17. The method according to claim 6, further comprising:
an image capture unit that captures an image, and generates image data corresponding to the captured image, wherein the target block corresponds to a part of the captured image.

18. The non-transitory computer readable storage medium according to claim 7, wherein the intra-prediction coding used to encode the target block is based on H.264.

19. The non-transitory computer readable storage medium according to claim 7, the method further comprising:
using a variance calculated from pixels included in the target block to determine whether or not the image corresponding to the target block is the low frequency band image.

20. The non-transitory computer readable storage medium according to claim 7, the method further comprising:
using a difference between a maximum value of luminance averages and a minimum value of the luminance averages to determine whether or not the image corresponding to the target block is the gradation image, wherein the luminance averages are calculated from blocks included in the target block.

21. The non-transitory computer readable storage medium according to claim 7, wherein the first block size corresponds to 16×16 pixels, the second block size corresponds to 8×8 pixels, and the third block size corresponds to 4×4 pixels.

22. The non-transitory computer readable storage medium according to claim 7, wherein a block size of the target block corresponds to 16×16 pixels.

23. The non-transitory computer readable storage medium according to claim 7, the method further comprising:
using pixels adjacent to the target block to determine whether or not the image corresponding to the target block is the gradation image.

24. The non-transitory computer readable storage medium according to claim 7, the method further comprising:
an image capture unit that captures an image, and generates image data corresponding to the captured image, wherein the target block corresponds to a part of the captured image.

\* \* \* \* \*